United States Patent
Tsuda (10) Patent No.: US 7,002,672 B2
(45) Date of Patent: Feb. 21, 2006

(54) OPTICAL FIBER STRAIN SENSOR DEVICE AND STRAIN DETECTION METHOD

(75) Inventor: Hiroshi Tsuda, Ibaraki-ken (JP)

(73) Assignee: National Institute of Advanced Science and Technology, Tokyo (JP)

(*) Notice: Subject to any disclaimer, the term of this patent is extended or adjusted under 35 U.S.C. 154(b) by 0 days.

(21) Appl. No.: 10/717,657

(22) Filed: Nov. 21, 2003

(65) Prior Publication Data

US 2004/0104337 A1    Jun. 3, 2004

(30) Foreign Application Priority Data

Nov. 25, 2002    (JP) .............................. 2002-340197

(51) Int. Cl.
*G01N 21/00* (2006.01)

(52) U.S. Cl. .................................... 356/73.1
(58) Field of Classification Search .............. 356/73.1, 356/477, 478, 32, 35.5; 385/10–14, 37; 250/227.14–227.19
See application file for complete search history.

(56) References Cited

U.S. PATENT DOCUMENTS

| 5,426,297 A | 6/1995 | Dunphy et al. |
| 5,818,585 A | 10/1998 | Davis et al. |
| 6,018,160 A | 1/2000 | Bennion et al. |
| 6,674,928 B1 * | 1/2004 | Johnson et al. ............... 385/12 |

FOREIGN PATENT DOCUMENTS

| DE | 199 13 800 A1 | 10/2000 |
| WO | WO 02/090893 A1 | 11/2002 |

* cited by examiner

*Primary Examiner*—Tu T. Nguyen
(74) *Attorney, Agent, or Firm*—Sughrue Mion, PLLC (57) ABSTRACT

To provide an optical fiber strain sensor device and a strain detection method, for measuring precisely AE and for detecting effectively a rapid strain change due to a shock load, an optical fiber strain sensor device includes an FBG sensor mounted on an object to be measured, a broadband light source for directing a broadband wavelength light ray to the FBG sensor, and an FBG filter that reflects or transmits a light ray reflected from the FBG sensor, and, using the FBG filter, the optical fiber strain sensor device processes and detects a change in the center wavelength of the light ray that has been incident from the broadband light source and then has been reflected from the FBG sensor.

4 Claims, 10 Drawing Sheets

OPTICAL FIBER STRAIN SENSOR DEVICE AND STRAIN DETECTION METHOD

BACKGROUND OF THE INVENTION

1. Technical Field of the Invention

The present invention relates to a method for detecting a strain change using a fiber Bragg grating (hereinafter referred to as "FBG") sensor and, more specifically, relates to a method for detecting an acoustic emission (hereinafter referred to as "AE") that is caused by infinitesimal damage in a material or a structural body.

The present invention is used when the soundness of a structural body is assessed by the AE method by generating an acoustic wave with a piezoelectric element, or when a fast strain change due to a shock load is detected. The present invention can be used in the structural examination of the soundness of mechanical constructions such as automobiles, aircraft, bridges, buildings, etc.

2. Description of the Related Art

Piezoelectric elements have been conventionally used to detect AE, and a strain gauge has been used to detect a shock load.

A technique has been proposed, in which a light ray reflected from a fiber Bragg grating (FBG) sensor is transmitted through an FBG having a Bragg wavelength substantially equal to the Bragg wavelength of the FBG sensor, with the AE then detected from the transmitted light (see, I. Perez, H. L. Cui and E. Udd, 2001 SPIE, Vol. 4328, p. 209–215). Optical spectrum analyzers have been conventionally used to measure a change in the Bragg wavelength of the FBG sensor.

Since the known piezoelectric technique used to detect AE directly converts measurement parameters into an electrical signal, that technique is subject to the effect of electromagnetic interference. On the other hand, in the proposed optical technique, the FBG sensor converts measurement parameters into an optical signal, and is thus free from the effects of electromagnetic interference, however, the detected waveform does not necessarily reflect the original shape of the AE, and may sometimes suffer from distortion. Further, the known technique of measuring a change in the Bragg wavelength of the FBG sensor using the optical spectrum analyzer typically works with a sampling rate of one sample per second. For this reason, the technique is unable to track and detect a dynamic strain change.

SUMMARY OF THE INVENTION

It is an object of the present invention to overcome the above drawbacks, and to provide an optical fiber strain sensor having the following features.

(1) The optical fiber strain sensor device precisely detects the AE or a rapid strain change due to a shock load using an FBG sensor.

(2) Using a single FBG sensor, the optical fiber strain sensor device detects a wide range of strain change.

(3) The optical fiber strain sensor device is free from the effect of electromagnetic interference because the FBG sensor converts measurement parameters into an optical signal.

The present invention provides an optical fiber strain sensor device that includes an FBG sensor including an optical fiber having an FBG written therein and mounted on an object to be measured, a broadband light source for directing a broadband light ray to the FBG sensor, and a filter that reflects or transmits a light ray reflected from the FBG sensor, wherein, by using the filter, the optical fiber strain sensor device processes a change in the center wavelength of the light ray that is incident from the broadband light source and then reflected from the FBG sensor.

The present invention further provides an optical fiber strain sensor device that includes an FBG sensor mounted on an object to be measured, a broadband light source for directing a broadband light ray to the FBG sensor, and a filter that reflects or transmits a light ray reflected from the FBG sensor, wherein a change in the wavelength of the light ray reflected from the FBG sensor or a change in the strain of the FBG sensor is detected in response to an amplitude change in a signal that is obtained through a process in which the phase of the light reflected from the filter and the phase of the light ray transmitted through the filter are inverted and then added to each other. The light ray incident from the broadband light source is reflected from the FBG sensor before being reflected from or transmitted through the filter.

The FBG sensor and the broadband light source are connected to each other through an optical circulator, and the FBG sensor and the filter are connected to each other through this or an additional optical circulator. The filter may be an FBG filter or a dielectric multi-layer filter.

A strain detection method of the present invention provides an optical fiber strain sensor device, wherein an FBG sensor including an optical fiber with an FBG written therein is mounted onto an object to be measured, a broadband wavelength light ray is incident on the FBG sensor, a light ray reflected from the FBG sensor is incident on a filter, and by using the filter, the optical fiber strain sensor device processes the light ray reflected from the FBG sensor taking advantage of the fact that the center wavelength of the light ray reflected from the FBG sensor varies in proportion to a strain sensed by the FBG sensor and thereby detects a change in the strain of the FBG sensor.

According to another embodiment, the strain detection method of the present invention provides an optical fiber strain sensor device, wherein an FBG sensor including an optical fiber with an FBG written therein is mounted onto an object to be measured, a broadband wavelength light ray is incident on the FBG sensor, a light ray reflected from the FBG is incident on a filter, and the optical fiber strain sensor device detects a strain change sensed by the FBG sensor by adding the light ray reflected from the filter and the light ray transmitted through the filter with one of the light rays inverted in phase, taking advantage of the fact that the light ray reflected from the filter and the light ray transmitted through the filter change in mutually opposite phase with respect to a change in the light ray reflected from the FBG.

BRIEF DESCRIPTION OF THE DRAWINGS

The embodiments of the present invention of an optical fiber strain sensor device of the present invention are discussed with reference to the following drawings, in which.

DETAILED DESCRIPTION OF THE PREFERRED EMBODIMENTS

The operating principle of the FBG is discussed with reference to FIG. 1. The FBG is structured such that the optical fiber core is periodically varied in refractive index, and reflects only an optical signal in a narrow band having twice the product of the refractive index and the period of changes of the refractive index as a center wavelength (referred to as the "Bragg wavelength").

Figure 1:
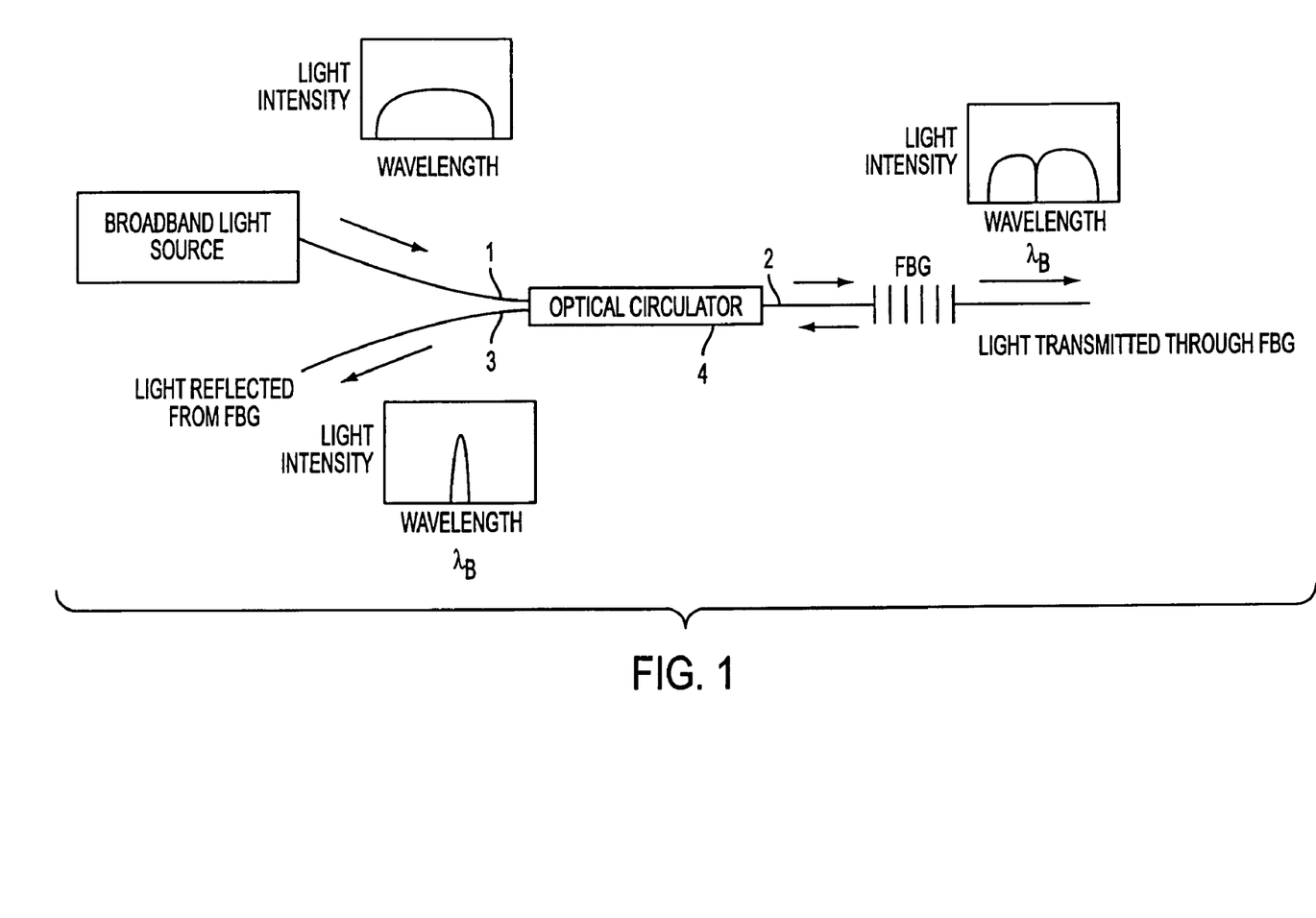
FIG. 1 illustrates the operational principle of the FBG.

As shown in FIG. 1, when a broadband light ray is incident on the FBG a light ray transmitted through the FBG has an intensity distribution lacking the Bragg wavelength region. A light ray reflected from the FBG has an intensity distribution having a narrow band centered on the Bragg wavelength. As shown in FIG. 1, optical circulator 4 is an optical element that transfers a light ray from a terminal 1 to a terminal 2 only, and from the terminal 2 to a terminal 3 only.

Figure 2:
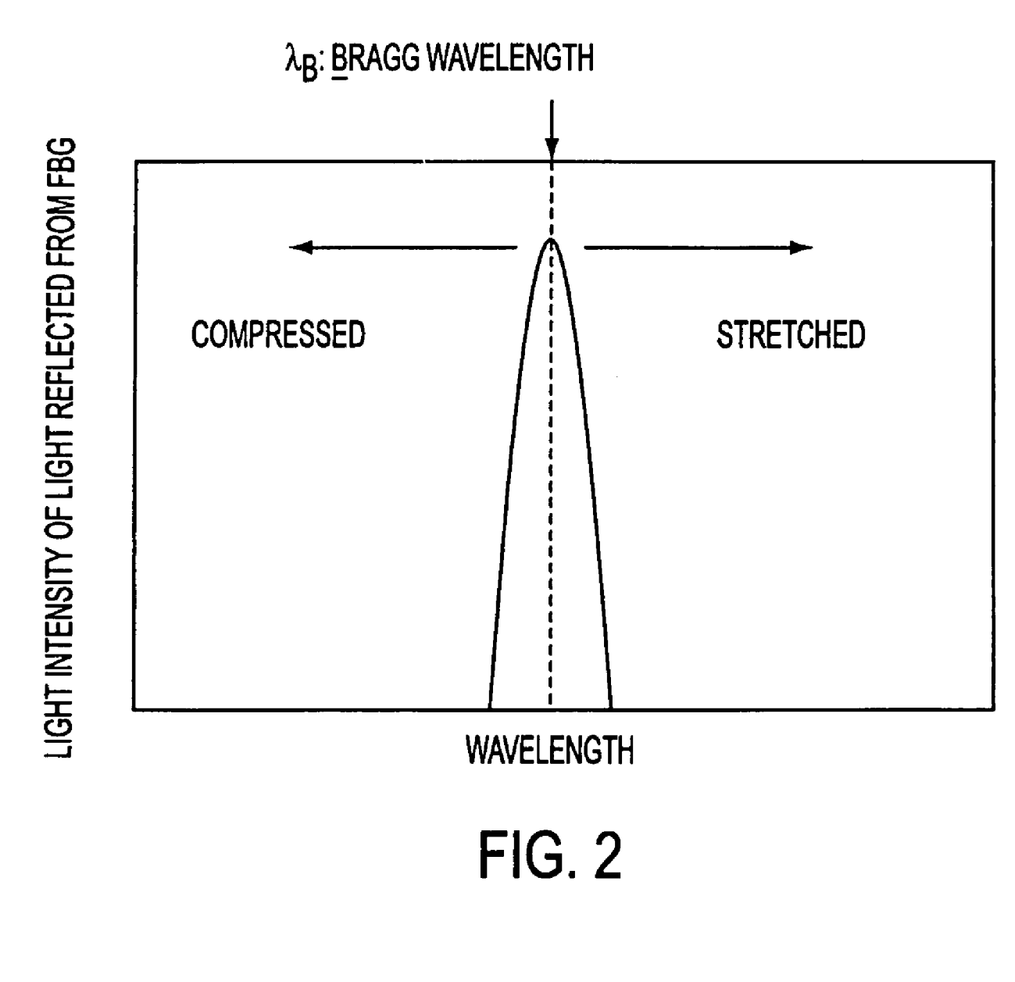
FIG. 2 illustrates the relationship between a Bragg wavelength and strain.

When the FBG suffers from strain and a temperature change, the Bragg wavelength thereof changes. More specifically, given a constant temperature, the Bragg wavelength becomes longer when the FBG is subject to tensile strain, and the Bragg wavelength becomes shorter when the FBG is subject to compressive strain as shown in FIG. 2.

Figure 3:
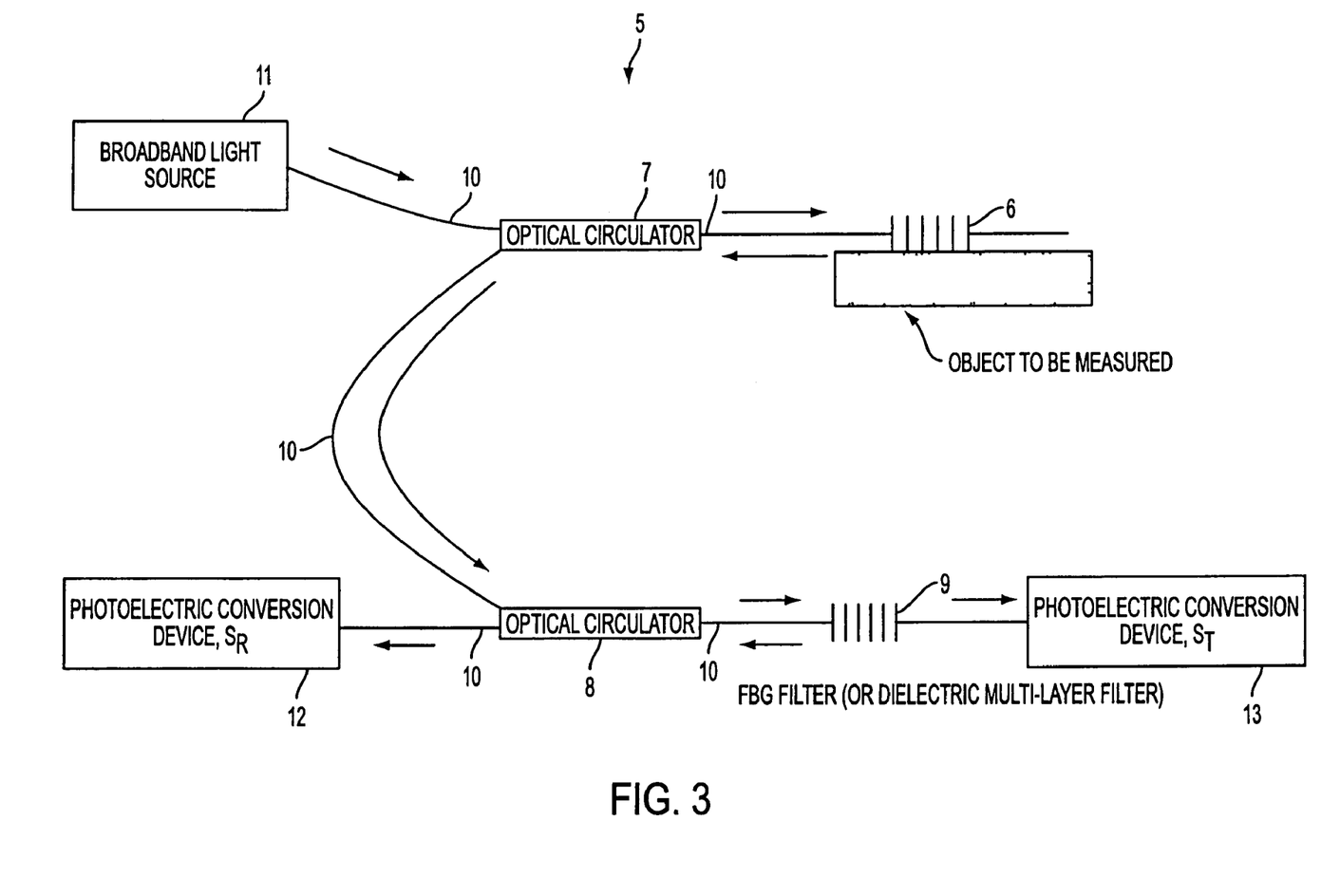
FIG. 3 illustrates a strain detection system using an FBG sensor.

FIG. 3 illustrates the structure of an optical fiber strain sensor device of the present invention and a strain detection method using the strain sensor device.

An optical fiber strain sensor device 5 of the present invention includes an FBG sensor 6, a first optical circulator 7, a second optical circulator 8, and an FBG filter 9 mutually connected through an optical fiber 10. The FBG sensor 6 is designed to be mounted on an object to be measured. A dielectric multi-layer filter may be substituted for the FBG filter 9.

The first optical circulator 7 is connected to a broadband light source 11 through the optical fiber. A first photoelectric conversion device 12 is connected to the first optical circulator 7 through the optical fiber 10. A second photoelectric conversion device 13 is connected to the FBG filter 9.

As shown in FIG. 3, a light ray from the broadband light source 11 is transferred, through the first optical circulator 7, to the FBG sensor 6 mounted on the object. A light ray reflected from the FBG sensor 6 is incident on the second optical circulator 8 through the first optical circulator 7. The light ray is then incident on the FBG filter 9. The light rays incident on the FBG filter 9, as two optical signals, namely, a light ray transmitted through the FBG filter 9 and a light ray reflected from the FBG filter 9 and picked up through the second optical circulator 8, are converted into electrical signals by the first and second photoelectric conversion devices 12 and 13.

Figure 4A:
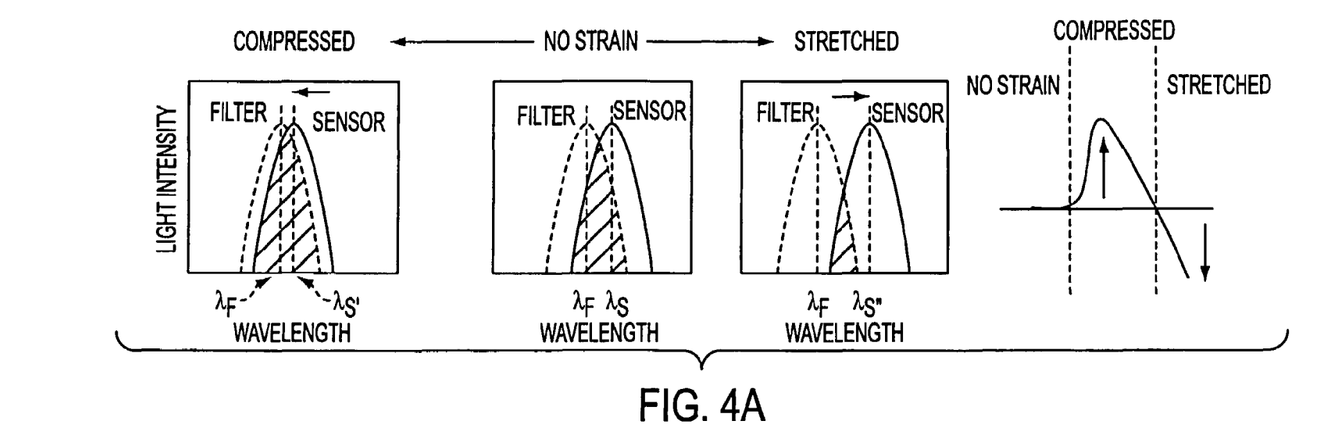
FIG. 4 illustrates the principle of strain change detection using the FBG sensor.

The relationship between the output of the first photoelectric conversion device 12 and the strain to which the FBG sensor 6 is subjected is discussed with reference to FIG. 4. FIG. 4(a) shows idealized reflective characteristics of the FBG sensor 6 and the filter 9 by solid and broken lines, respectively. Let $\lambda_S$ represent the Bragg wavelength of the FBG sensor 6 with no strain. The intensity distribution of the light ray reflected from the FBG sensor 6 is represented by an area surrounded by the solid line in the center illustration of FIG. 4(a).

The light ray having this intensity distribution is incident on the FBG filter 9. Since the FBG filter 9 has the reflective characteristics represented by the broken line, the output of the first photoelectric conversion device 12 that detects the intensity of the light ray reflected from the FBG filter 9 is proportional to an area of a region (a hatched area) where the area surrounded by the solid line and the area surrounded by the broken line overlap.

When the FBG sensor 6 is subject to compressive strain, the Bragg wavelength of the FBG sensor 6 is reduced to $\lambda_{S'}$ ($<\lambda_S$). Since the Bragg wavelength $\lambda F$ of the FBG filter 9 remains unchanged, an overlapping area of the two reflective characteristics increases (see the left-hand illustration in FIG. 4(a)). The output of the first photoelectric conversion device 12 becomes higher than when no strain occurs. On the other hand, when the FBG sensor 6 is subject to tensile strain, the Bragg wavelength of the FBG sensor 6 becomes longer and reaches $\lambda_{S''}$ ($>\lambda_S$). In this case, the overlapping area of both reflective characteristics is reduced, and the output of the first photoelectric conversion device 12 is lowered (see the right-hand illustration in FIG. 4(a)). With the output of the first photoelectric conversion device 12 with no strain considered as a benchmark, the output of the first photoelectric conversion device 12 increases with the compressive strain acting on the FBG sensor 6 and decreases with the tensile strain acting on the FBG sensor 6.

Figure 4B:
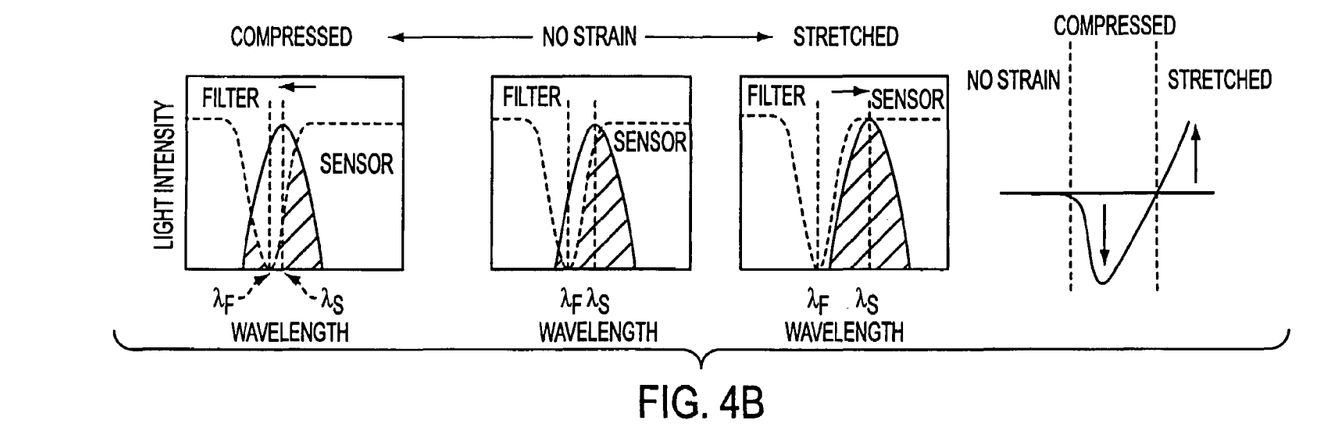

The transmittance of the FBG filter 9 is represented by transmittance=1-reflectance. FIG. 4(b) illustrates the reflective characteristics of the sensor and the transmissive characteristics of the filter in response to a change in the strain the sensor is subjected to. From the foregoing discussion, the output of the second photoelectric conversion device 13 that detects the intensity of the light ray transmitted through the FBG filter 9 is lowered in response to the compressive strain and is heightened in response to the tensile strain.

Figure 6:
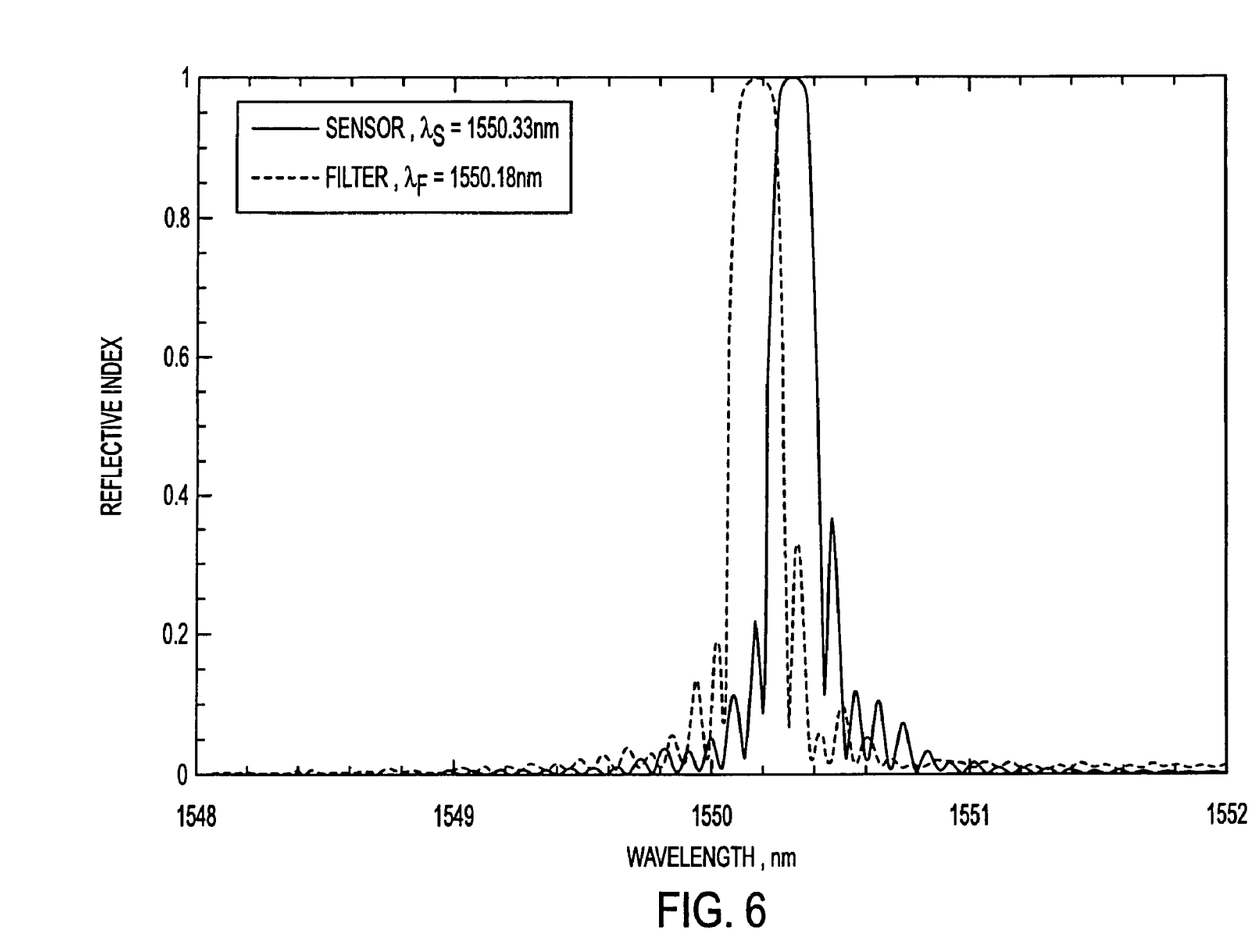
FIG. 6 illustrates reflective characteristics of an FBG sensor and a filter.

The actual reflective characteristics of the FBG are not as simple as those shown in FIGS. 4(a) and 4(b). The actual characteristics are shown in FIG. 6. Because of such complex reflective characteristics, the output of the first photoelectric conversion device 12 that detects the intensity of the light ray reflected from the FBG filter 9 is not necessarily heightened in a monotonous fashion when the tensile strain increases. The same is true of the second photoelectric conversion device 13. In other words, the output of the second photoelectric conversion device 13 changes in a non-linear fashion in response to the strain to which the FBG sensor 6 is subjected.

It is believed by the inventors that the light ray transmitted through the FBG filter 9 and the light ray reflected from the FBG filter 9 are opposite to each other in phase in response to the strain to which the FBG sensor 6 is subjected to, and that a signal that is obtained by summing the transmitted light ray and the reflected light ray, with one of the two light rays inverted in phase, changes linearly in response to a change in the strain to which the FBG sensor 6 is subjected.

Examples of the present invention are now discussed to explain the operation of the optical fiber strain sensor device 5 of the present invention and the strain detection method using the sensor device 5, and to demonstrate the advantages of the sensor device 5 and the method thereof.

Figure 5:
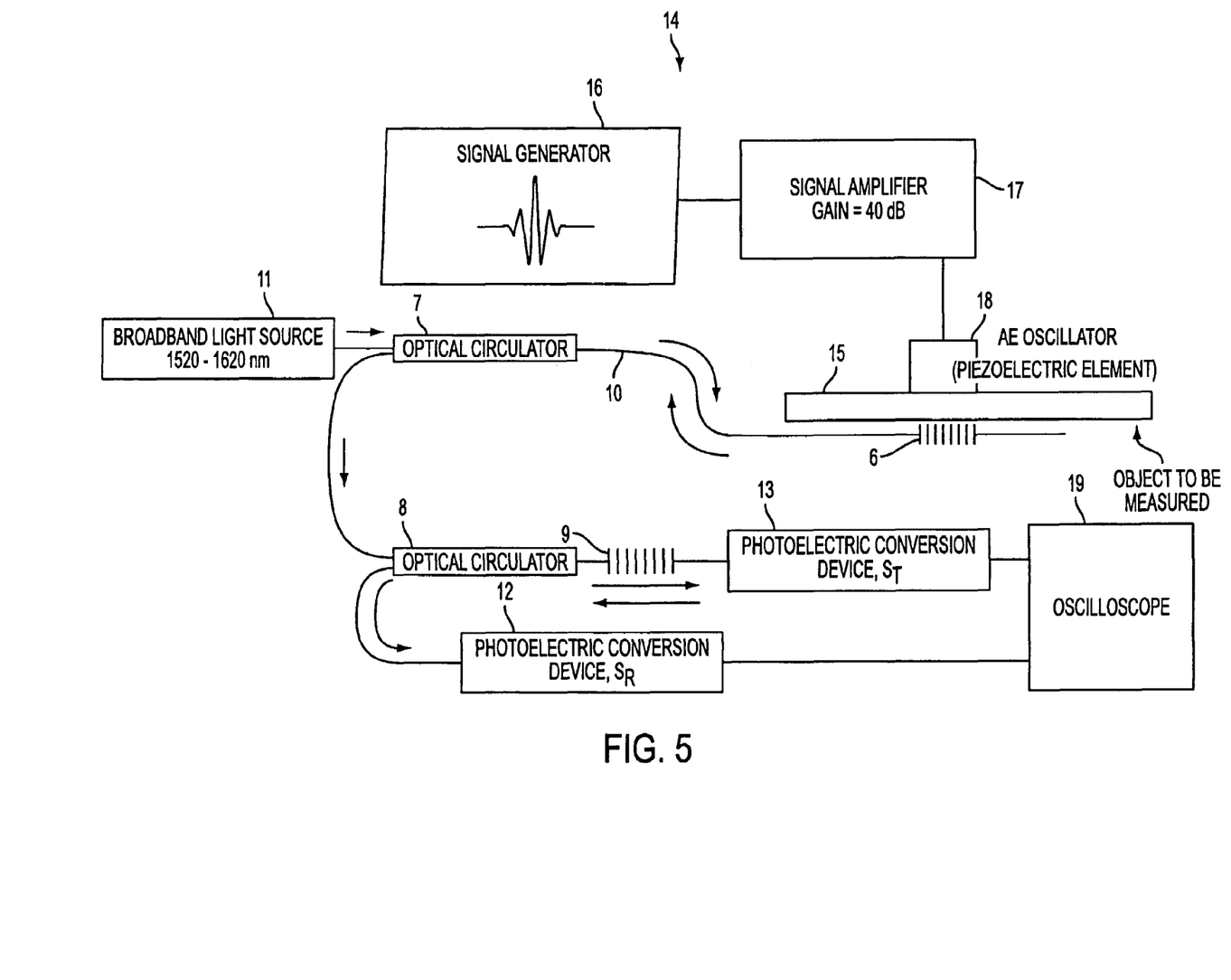
FIG. 5 illustrates a demonstration test system.

A measurement apparatus 14 shown in FIG. 5 includes the optical fiber strain sensor device 5 of the present invention shown in FIG. 3 as a major element, and further includes a signal generator 16, a signal amplifier 17, and an AE oscillator (piezoelectric element) 18 to supply an object 15 to be measured with a vibration (i.e., to impose a strain for test purposes); and further includes an oscilloscope 19 as a means for measuring, displaying and processing the signals SR and ST of the first photoelectric conversion device 12 and the second photoelectric conversion device 13. Any known means for performing the signal analysis functions of the oscilloscope, such as standard signal processing hardware, can be substituted for the oscilloscope. Further, one of skill in the art will appreciate that the electrical processing of photoelectrically converted light signals could be substituted by direct optical processing.

A test was conducted using the measurement apparatus 14 to test the optical fiber strain sensor device 5 of the present invention and the strain detection method using the optical fiber strain sensor device 5.

In this test, the signal generator 16 generated a tone burst signal having a center frequency centered on 180 kHz, and a signal amplified by the signal amplifier 17 (gain=40 dB) was supplied to the AE oscillator 18 having a resonance frequency of 180 kHz. The FBG sensor 6 was bonded to the object 15 using a strain gauge cement. A rapid strain change was applied to the object 15 using the AE oscillator 18, while at the same time a light ray from the broadband light source 11 having a wavelength range 1520–1620 nm was incident on the FBG sensor 6 through the first optical circulator 7.

A change in the strain of the FBG sensor 6 was detected. Since the strain change provided by the AE oscillator 18 has a frequency and strain at the same level as the acoustic emission (AE) that is caused during the infinitesimal destruction of a material, the detection of the strain in this case is identical to the measurement of the AE.

The light ray from the FBG sensor 6 was incident on the second optical circulator 8 through the first optical circulator 7. With the light ray incident on the FBG filter 9, a light ray transmitted through the FBG filter 9 and a light ray reflected from the FBG filter 9 were detected by the second photoelectric conversion device 13 and the first photoelectric conversion device 12, respectively. The electrical signals SR and ST, converted by the first photoelectric conversion device 12 and the second photoelectric conversion device 13, were then measured on the oscilloscope.

FIG. 6 shows reflective characteristics of the FBG sensor 6 and the FBG filter 9 used in this test. The FBG sensor 6 and the FBG filter 9 have Bragg wavelengths of 1550.33 and 1550.18 nm, respectively.

Figure 7:
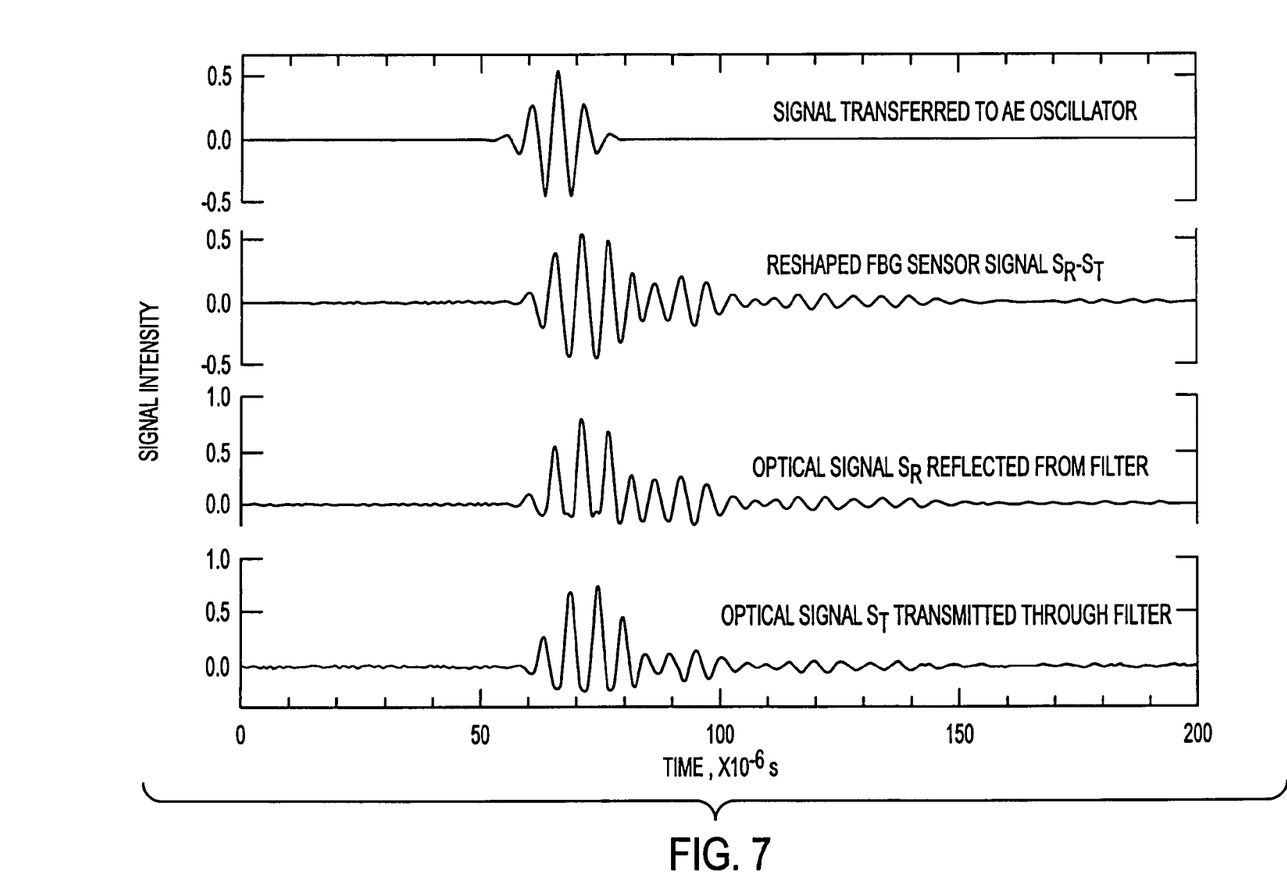
FIG. 7 illustrates an AE waveform detected by the FBG sensor.

Test Result 1: Repeatability of Waveform:

FIG. 7 shows four signals, namely, (1) a signal applied to the AE oscillator 18, (2) signals SR and ST from the first photoelectric conversion device 12 and the second photoelectric conversion device 13 (the third and fourth traces in the Figure), and (3) a processed signal (SR-ST) (the second trace in the Figure). The signals SR and ST from the first photoelectric conversion device 12 and the second photoelectric conversion device 13 are mutually opposite to each other in phase. The output level responsive to the tensile strain and the output level responsive to the compressive strain are not symmetrical with respect to the output level responsive to no strain as a reference level, and the output signals become different from the signal sent to the AE oscillator 18.

This is attributed to the complex shapes of the reflective characteristics of the FBG sensor 6 and the filter 9. However, a signal that is obtained by inverting the signal ST in phase, and then summing the inverted signal and the signal SR (in practice, a difference between the two signals SR and ST is determined) has the same shape as the signal transferred to the AE oscillator 18.

Figure 8:
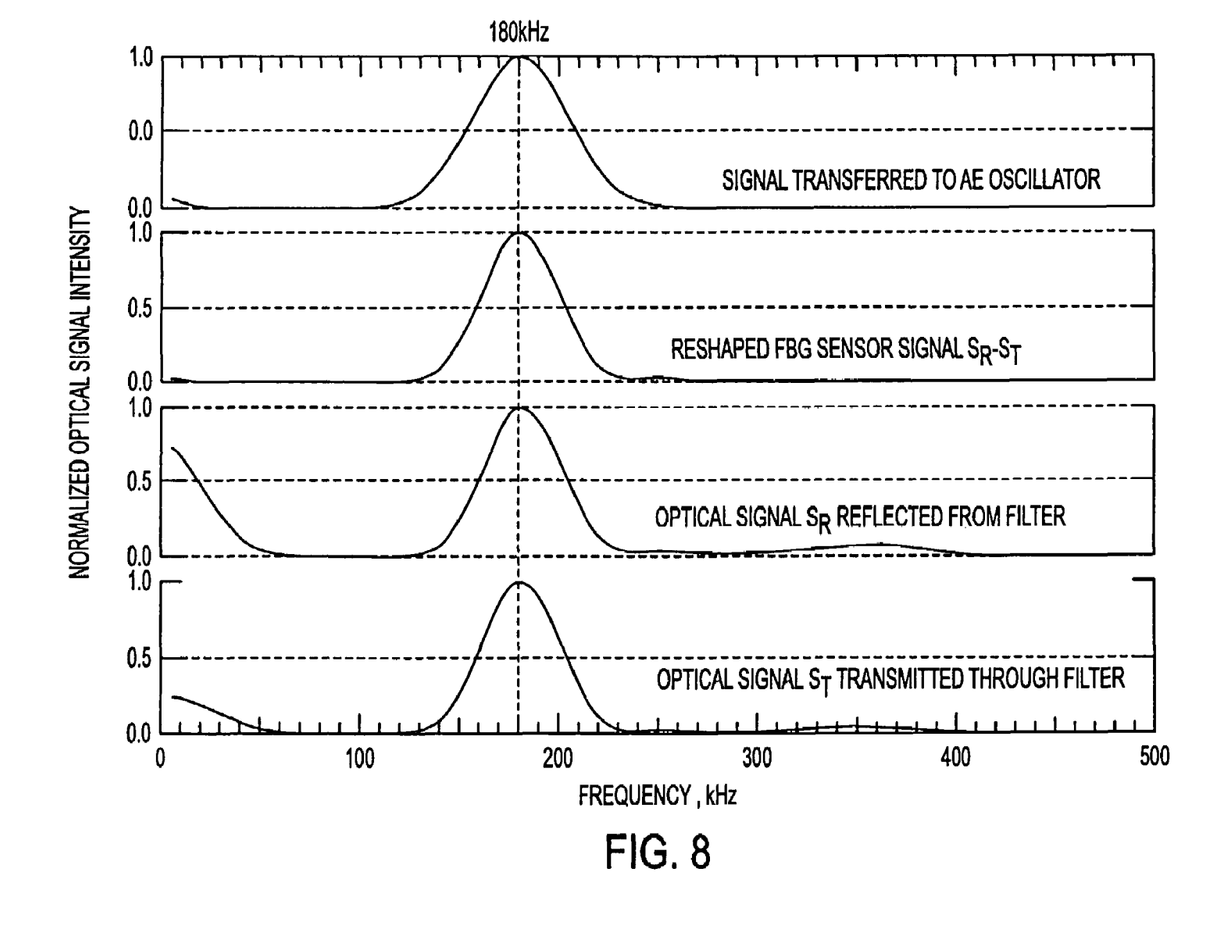
FIG. 8 illustrates a frequency component intensity of a signal detected by the FBG sensor.

Test Result 2: Frequency Analysis:

FIG. 8 illustrates an analysis result of a frequency component intensity of the signals illustrated in FIG. 7. The signal input to the AE oscillator 18 is a signal having a center frequency at 180 kHz. The signal SR and the signal ST from the first and second photoelectric conversion devices have a high intensity level in a low frequency region, and exhibit a frequency component intensity distribution different from the transferred signal. On the other hand, the processed signal has the frequency component intensity matching the transferred signal.

Figure 9:
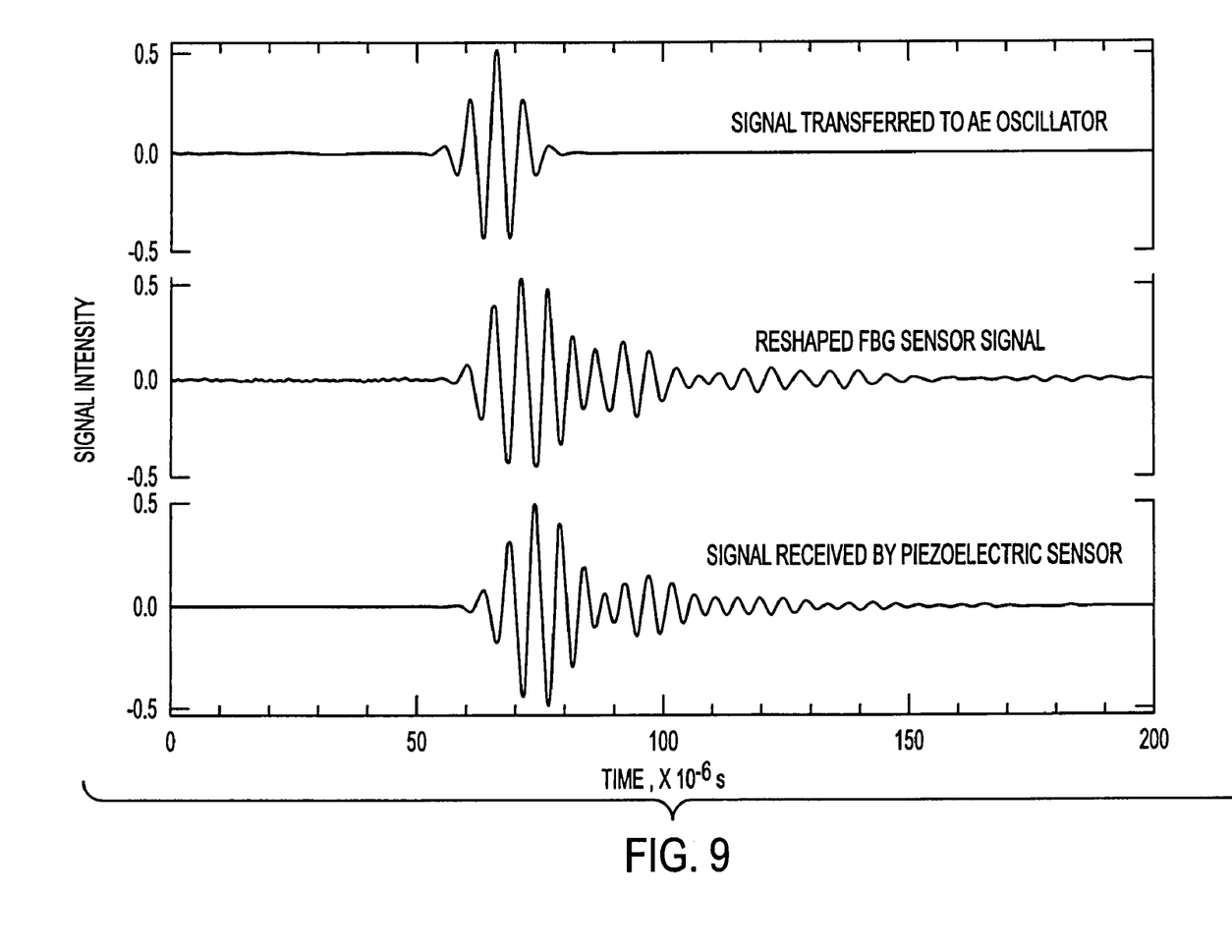
FIG. 9 illustrates responses of the FBG sensor and a piezoelectric sensor with respect to AE.
Figure 10:
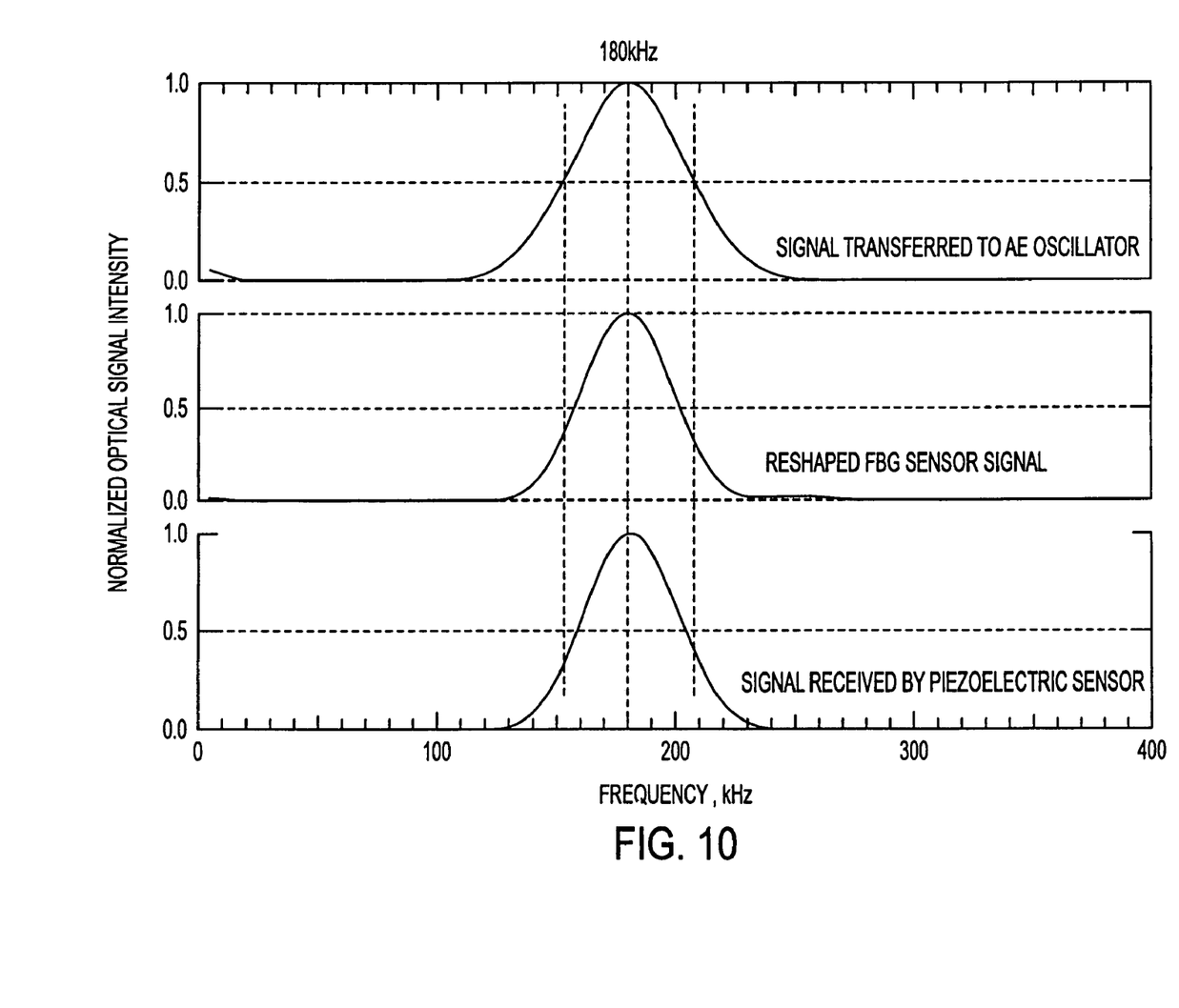
FIG. 10 illustrates a frequency component intensity of signals of the FBG sensor and the piezoelectric sensor.

Test Result 3: Comparison of Responses of the FBG Sensor 6 and the Piezoelectric Sensor with Respect to AE:

Piezoelectric sensors have been conventionally in widespread use for the AE measurement. The response of the FBG sensor 6 was compared with the response of a commercially available piezoelectric sensor with respect to AE. As a result, the signal from the FBG sensor 6, which was processed shown in FIG. 9, and the signal from the piezoelectric sensor appear the same in waveform. This demonstrates that the signal processing allows the FBG sensor 6 to be used as an AE sensor in the same way as a piezoelectric element is conventionally used. FIG. 10 illustrates the results of analysis of the frequency component intensity of the signals illustrated in FIG. 9. Signals detected from the FBG sensor 6 and the piezoelectric element sensor exhibit identical characteristics.

The above test demonstrates that the present invention provides the following advantage. The AE having a tone burst shaped wave, oscillated by the piezoelectric element, was picked up by the FBG sensor 6, and was then signal processed using the FBG filter 9 as a filter in the technique of the present invention. The waveforms of the transmitted wave and the reflected wave of the FBG filter 9 do not reproduce the original waveform of the AE. The waveform signal processed in accordance with the proposed technique of the present invention reproduced the original wave shape of the AE.

If the frequency component intensity of the wave reflected from the FBG filter 9 and the wave transmitted through the FBG filter 9 are analyzed, the reflected wave and the transmitted wave exhibit a frequency component intensity distribution different in features from the original waveform. On the other hand, the signal processed wave shape agrees with the frequency component intensity distribution of the original waveform.

The AE detection waveform from the disclosed sensor was compared with the AE waveform of a commercially available piezoelectric element sensor that has been conventionally in widespread use. As a result, the waveform that is obtained by signal processing the wave reflected from the FBG sensor 6 appears the same as the piezoelectric element sensor, and the frequency intensity analysis results of the two sensors well agree with each other.

The optical fiber strain sensor device having the above-referenced structure in accordance with the present invention detects the AE using the FBG sensor. In comparison with the technique that measures the AE using only the wave transmitted through the filter, the technique of the present invention achieves more precise AE measurement. The technique is effective for detecting a rapid strain change due to a shock load.

Embodiments of the optical fiber strain sensor device and the strain detection method of the present invention have been described herein, but the present invention is not limited to these embodiments, and various embodiments are possible without departing from the scope of the invention described in the claims.

What is claimed is:

1. An optical fiber strain sensor device, comprising; an FBG sensor mounted on an object to be measured, a broadband light source for directing a broadband light ray to the FBG sensor, and a filter that both reflects and transmits a light ray reflected from the FBG sensor, means for detecting a change in the wavelength of the light ray reflected from the FBG sensor or a change in the strain of the FBG sensor, including means for detecting an amplitude change in a signal that is obtained by inverting the phase of one of: (a) a signal representative of the light ray reflected from the filter and (b) a signal representative of the light ray transmitted through the filter, and then adding the inverted and non-inverted signals to each other.

2. An optical fiber strain sensor according to claim 1, wherein the filter is an FBG filter or a dielectric multi-layer filter.

3. An optical fiber strain sensor according to claim 1, wherein said means for detecting includes first and second photoelectric conversion devices for receiving, respectively, light rays reflected from and transmitted through said filter, and signal processing apparatus for inverting the phase of an output of a selected one of said photoelectric conversion devices, combining the inverted and non-inverted outputs, and measuring at least one characteristic of the combined outputs.

4. A strain detection method using an optical fiber strain sensor device, wherein an FBG sensor including an optical fiber with an FBG written therein is mounted onto an object to be measured, a broadband wavelength light ray is made incident on the FBG sensor, a light ray reflected from the FBG sensor is made incident on a filter, and the optical fiber strain sensor device detects a strain change sensed by the FBG sensor by summing the light ray reflected from the filter and the light ray transmitted through the filter with one of the light rays inverted in phase, the light ray reflected from the filter and the light ray transmitted through the filter changing in mutually opposite phase with respect to a change in the light ray reflected from the FBG, and detecting an amplitude change in the sum.

* * * * *